United States Patent Office 3,294,636
Patented Dec. 27, 1966

3,294,636
COUMARINYL PHOSPHATE INTESTINAL NEMATOCIDES AND THE METHOD FOR USING SAME
Norman Cooper Brown, Algiers, Northchurch Common, and Donald Thomas Hollinshead, Boxmoor, England, assignors to Cooper, McDougall & Robertson Limited, Berkhamsted, Hertfordshire, England, a British company
No Drawing. Continuation of application Ser. No. 156,477, Dec. 1, 1961. This application Mar. 26, 1965, Ser. No. 443,177
13 Claims. (Cl. 167—53)

This is a continuation of application Serial No. 156,477 filed December 1, 1961, now abandoned.

The present invention relates to organo-phosphorus compounds, to the method of preparing them and to formulations containing them.

It has been found that organo-phosphorus compounds of the general Formula I effectively decrease infestations of the nematodes *Aspiculuris tetraptera, Nematospiroides dubius* and *Syphacia obvelata* in the gastro-intestinal tract of mice, of Cooperia spp., Haemonchus spp., Oesophagostomum spp., Strongyloides spp., Trichostrongylus spp. and Nematodirus spp. in the gastro-intestinal tract of sheep and cattle, of Ancylostoma spp. and Toxascaris spp. in the gastro-intestinal tract of dogs, and of *Capellaria obsignata* in chickens.

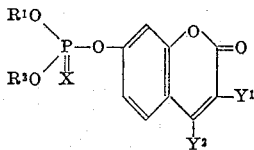

(I)

In Formula I and subsequent formulae:

$R^1$ and $R^2$ are the same or different, each is an alkyl group of from one to six carbon atoms and at least one of the said groups $R^1$ and $R^2$ is substituted with a chlorine or bromine atom X is an oxygen or sulphur atom; and $Y^1$ and $Y^2$ are the same or different and each is a hydrogen, chlorine or bromine atom or an alkyl group containing from one to four carbon atoms, or a benzyl or phenyl group optionally substituted in the ring with one or more members of the class consisting of nitro group, chlorine and bromine atoms and alkyl groups containing from one to four carbon atoms, or $Y^1$ and $Y^2$ form a group $Y^1$—$Y^2$ which is an alkylene chain containing from three to six carbon atoms.

The preferred compounds of Formula I comprise those wherein $R^1$ and $R^2$ are each an alkyl group containing two to four carbon atoms and each is substituted with one chlorine or bromine atom, X is an oxygen atom, $Y^1$ is a hydrogen, chlorine or bromine atom or a methyl, ethyl, or benzyl group, and $Y^2$ is a methyl or ethyl group or is a phenyl group substituted in one or more positions with a chlorine atom.

The specifically preferred compounds are

O,O-bis-(2-chloroethyl)-O-7-(4-methylcoumarinyl) phosphate,
O,O-bis-(2-chloroethyl)O-7-(3-chloro-4-methylcoumarinyl)phosphate,
O,O-bis-(3-chloropropyl)-O-7-(4-methylcoumarinyl) phosphate,
O,O-bis-(2-chloropropyl)-O-7-(4-methylcoumarinyl) phosphate,
O,O-bis-(2-chloroethyl)-O-7-(3-ethyl-4-methylcoumarinyl)phosphate,
O,O-bis-(2-chloroethyl)-O-7-(4-phenylcoumarinyl) phosphate,
O,O-bis-(3-chloropropyl)-O-7-(3-chloro-4-methylcoumarinyl)phosphate,
O,O-bis-(2-chloroethyl)-O-7-(3-methyl-4-ethylcoumarinyl)phosphate,
O,O-bis-(2-chloroethyl)-O-7-(4-[2,4-dichlorophenyl] coumarinyl)phosphate,
and
O,O-bis-(2-chloroethyl)-O-7-(3-bromo-4-methylcoumarinyl)phosphate.

According to the present invention in one aspect, there is provided an organo-phosphorus compound of the general formula I.

The organo-phosphorus compounds of the general Formula I may be prepared by the reaction of a phosphorus compound of the general Formula III

(III)

with a coumarin compound of the general Formula IV

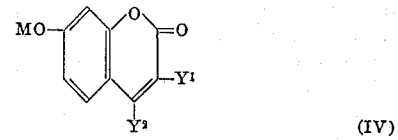

(IV)

wherein $R^1$, $R^2$, $Y^1$ and $Y^2$ are defined above, Z is a halogen atom preferably chlorine, and M is a hydrogen or an alkali metal atom. The reaction is preferably carried out in the presence of an acid binding agent, such as an alkali carbonate, for example, sodium carbonate, or an organic base, for example, triethylamine, of a solvent such as acetone, ethylmethylketone, methylpropylketone, toluene, carbon tetrachloride or benzene, and of a catalyst such as finely divided copper, and with heating. The reaction may satisfactorily be carried out in the absence of the acid binding agent if in the coumarin compound of Formula IV M is an alkali metal atom.

The phosphate compounds of Formula I may also be prepared by reacting a phosphorus compound of Formula III, wherein Z is a hydrogen atom, with a coumarin compound of Formula IV wherein M is also a hydrogen atom, in the presence of an acid binding agent, such as an alkali carbonate, for example potassium carbonate, or an organic acid binding agent, for example pyridine, preferably at a temperature between 10° and 50° C. The reaction is carried out in the presence of a polyhalogenated aliphatic hydrocarbon oxidising agent such as carbon tetrachloride, and this may also act as a solvent medium.

The organo-phosphorus compounds of the general Formula I may be used in the treatment of nematode infections in a formulation containing a diluent and a dispersing or surface active agent and may be presented in a draft or drench in water, in capsules or cachets in the dry state or in a non-aqueous suspension when a suspending agent may be included, in tablets when a binder or lubricant may be included, in a suspension in water or an oil or in a water/oil emulsion when a flavouring, preserving, thickening or emulsifying agent may be included, or in the food of the host. The preferred formulations are dispersible and wettable powders and tablets.

The invention will now be described with reference to the following examples in which all the temperatures are given in degrees centigrate, all percentages are by weight and "M.P." represent the melting point.

In those examples marked with an asterisk, the product was obtained as an oil. The oil was then dissolved in benzene (20 ml.) and added to an alumina column (5 cm. x 2 cm.), eluted with benzene (40 ml.) and one fraction was obtained. The benzene was evaporated at reduced pressure (100 mm./Hg) and the residue recrystallised from ethanol. The melting points of the crystals are given in the respective examples.

Example 1

To a mixture of 4-methyl-7-hydroxycoumarin (17.6 g.) and bis-2-chloroethyl phosphite (22.8 g.) in carbon tetrachloride (60.0 ml) was slowly added triethylamine (11.2 g.), the rate being such that the temperature of the reaction was kept between 25°–30°. After the addition of the triethylamine the mixture was stirred for two hours and allowed to stand overnight. The mixture was then diluted with water and filtered. The solid was washed with water and recrystallised from ethanol. The product, O,O-bis-(2-chloroethyl)-O-7-(4-methylcoumarinyl)phosphate, had an M.P. of 68°. On analysis it was found to contain phosphorous 8.2%, chlorine 18.3% (theoretical amounts are phosphorous 8.2%, chlorine 18.7%).

Example 2

To a mixture of 3-chloro-4-methyl-7-hydroxycoumarin (42 g.) and bis-2-chloroethyl phosphite (45.6 g.) in carbon tetrachloride (120 ml.) was added slowly triethylamine (22.4 g.), the temperature being kept between 25°–30° by adjusting the rate of addition of the triethylamine. The mixture was then stirred for two hours and allowed to stand overnight. The mixture was diluted with water and filtered, and then the solid was washed with water before being recrystallised from ethanol. The product, O,O-bis-(2-chloroethyl)-O-7-(3-chloro-4-methylcoumarinyl)phosphate, had an M.P. of 91°. On analysis it was found to contain phosphorous 7.9%, chlorine 26.2% (theoretical amounts are phosphorous 7.8%, chlorine 26.6%).

Example 3

To a stirred mixture of 3-chloro-4-methyl-7-hydroxycoumarin (21 g.) and anhydrous potassium carbonate (50 g.) in ethylmethylketone (100 ml.) heated between 60–65° was slowly added bis-(2-chloroethyl)thiophosphorylchloridate (26 g.). When the addition was complete the mixture was stirred and refluxed for four hours. The mixture was filtered and the solid washed with ethylmethylketone, which was removed by distillation at a reduced pressure. The residue was dissolved in benzene, and washed with dilute sodium bicarbonate solution and with water, and dried with anhydrous sodium sulphate. The benzene was removed by distillation at a reduced pressure. On standing the residue solidified to waxy solid O,O-bis-(2-chloroethyl)-O-7-(3-chloro-4-methylcoumarinyl) phosphorothioate, which had an M.P. of 74° after trituration with alcohol. On analysis it was found to contain phosphorous 7.4%, chlorine 24.8%, sulphur 7.5% (theoretical amounts are phosphorous 7.2%, chlorine 24.6%, sulphur 7.4%).

Example 4

To a mixture of 4-(2,4-dichlorophenyl)-7-hydroxycoumarin (6.8 g.) and bis-2-chloroethyl phosphite (5.1 g.) in carbon tetrachloride at 10° was added triethylamine (3.2 g.) at a rate such that the temperature of the reaction mixture did not exceed 40°. The mixture was left overnight at room temperature before being diluted with water. The organic layer was separated and washed successively with hydrochloric acid, potassium hydroxide solution, water and brine. The solution was dried with anhydrous sodium sulphate and the solvent removed by distillation leaving O,O-bis-(2-chloroethyl)-O-7-[4-(2,4-dichlorophenyl)coumarinyl]phosphate which solidified at room temperature. On analysis it was found to contain phosphorous 6.04%, chlorine 27.5% (theoretical amounts are phosphorous 6.05%, chlorine 27.6%). It had an M.P. of 64–66°.

Example 5

To a heated and stirred mixture of 3-chloro-4-methyl-7-hydroxycoumarin (138.6 g.), sodium carbonate (90.0 g.) and benzene (1.5 l.) was added bis-(2-chloroethyl) phosphochloridate (144 g.) over a period of two hours. At the end of this period the heating was continued for a further two hours and the upper benzene layer separated out on the addition of cold water (500 ml.). The benzene layer was washed with a solution of sodium carbonate (200 ml.) and water and dried over anhydrous sodium sulphate. The benzene was then removed by distillation and the residue twice recrystallised from ethanol (500 ml.) to produce O,O-bis-(2-chloroethyl)-O-7-(3-chloro-4-methylcoumarinyl)phosphate with a M.P. 91–92°.

The following compounds were prepared in a manner

| Example | Compound | Uncorrected M.P. | Preparation | Composition of Compound ||||||
|---|---|---|---|---|---|---|---|---|---|
| | | | | Found on analysis ||| Theoretical |||
| | | | | Percent P | Percent Cl | Percent S | Percent P | Percent Cl | Percent S |
| 6 | O,O-Bis-(2-chloroethyl)-O-7-(4-p-tolyl-coumarinyl) phosphate. | 82–83° | 4 | 6.9 | 15.1 | | 6.8 | 15.5 | |
| 7 | O,O-Bis-(2-chloroethyl)-O-7-(3-methyl-4-ethylcoumarinyl) phosphate. | 70–71° | 4 | 7.1 | 18.8 | | 7.6 | 17.4 | |
| 8 | O,O-Bis-(2-chloroethyl)-O-7-(3,4-trimethylenecoumarinyl) phosphate. | 67–68° | 4 | 7.9 | 18.3 | | 7.6 | 17.4 | |
| 9 | O,O-Bis-(2-chloroethyl)-O-7-(3,4-tetramethylenecoumarinyl) phosphate. | 99–100° | 4 | 7.2 | | | 7.35 | | |
| 10* | O,O-Bis-(2-chloroethyl)-O-7-(4-phenylcoumarinyl) phosphate. | 86–87° | 4 | 6.95 | 15.4 | | 7.0 | 16.0 | |
| 11* | O,O-Bis-(2-chloroethyl)-O-7-(3-ethyl-4-methylcoumarinyl) phosphate. | 57–58° | 4 | 7.4 | 17.1 | | 7.6 | 17.4 | |
| 12≠ | O,O-Bis-(2-chloroethyl)-O-7-(4-methylcoumarinyl) phosphate. | ($n_D^{20}$ 1.5390) | 1 | 7.9 | 17.8 | | 7.6 | 17.4 | |
| 13 | O,O-Bis-(2-chloroethyl)-O-7-(4-methylcoumarinyl) phosphorothioate. | 48° | 1 | 8.6 | 18.9 | 8.1 | 7.8 | 17.9 | 8.06 |
| 14≠ | O,O-Bis-(3-chloropropyl)-O-7-(3-chloro-4-methylcoumarinyl) phosphate. | ($n_D^{20}$ 1.5990) | 1 | 6.85 | 23.5 | | 7.00 | 24.0 | |
| 15 | O,O-Bis-(2-bromoethyl)-O-7-(4-methylcoumarinyl) phosphate. | 71–72° | 1 | 6.7 | (34.2 Br) | | 6.6 | (34.0 Br) | |
| 16 | O,O-Bis-(2-bromoethyl)-O-7-(3-chloro-4-methylcoumarinyl) phosphate. | 91° | 1 | 5.9 | | | 6.15 | | |
| 17 | O,O-Bis-(2-chloropropyl)-O-7-(3-chloro-4-methylcoumarinyl) phosphate. | 71° | 1 | 6.8 | 24.1 | | 7.0 | 24.0 | |
| 18 | O,O-Bis-(2-chloroethyl)-O-7-(3-phenyl-4-methylcoumarinyl) phosphate. | 92–94° | 1 | 6.5 | 15.2 | | 6.75 | 15.5 | |
| 19 | O,O-Bis-(2-chloroethyl)-O-7-(3-bromo-4-methylcoumarinyl) phosphate. | 92–93° | 1 | 6.84 | | | 6.74 | | |
| 20 | O,O-Bis-(2-bromoethyl)-O-7-(3-bromo-4-methylcoumarinyl) phosphate. | 96–97° | 1 | 5.95 | (44.0 Br) | | 5.65 | (43.7 Br) | |
| 21≠ | O,O-Bis-(3-chloropropyl)-O-7-(4-methylcoumarinyl) phosphate. | ($n_D^{20}$ 1.5368) | 1 | 7.55 | 17.6 | | 7.6 | 17.4 | |
| 22 | O,O-Bis-(2-chloroethyl)-O-7-(3,4-pentamethylenecoumarinyl) phosphate. | 76–77° | 4 | 6.84 | 16.5 | | 7.1 | 16.3 | |
| 23 | O,O-Bis-(2-chloroethyl)-O-7-(3-benzyl-4-methylcoumarinyl) phosphate. | 76–78° | 3 | 6.5 | 15.2 | | 6.6 | 15.1 | | similar to that described in the example listed in the column headed "Preparation."

The following compounds were prepared in a manner similar to that described in the example listed in the column headed "Preparation."

In the examples indicated by the sign ≠, namely, Examples 12, 14 and 21, the product was obtained as an oil. The refractive indices of these oils are shown by the symbol $n_D^{20}$ in the column headed "Uncorrected M.P."

Example 24

A formulation was prepared by the admixture of the following components to produce a suspension:

|  | Percent |
|---|---|
| O,O-bis-(2-chloroethyl)-O-7-(3-chloro - 4 - methyl-coumarinyl)phosphate | 12.8 |
| Neosyl | 12.0 |
| Bentonite | 1.5 |
| Dispersol AC | 1.0 |
| Sodium benzonate | 1.0 |
| Water | 71.7 |

Example 25

A formulation was prepared by milling the following components to produce a wettable powder:

|  | Percent |
|---|---|
| O,O-bis-(2-chloroethyl)-O-7-(3-chloro - 4 - methyl-coumarinyl)phosphate | 50.0 |
| Orotan N | 3.0 |
| Perminal BX | 3.0 |
| Hyflo-Super-Cel | 44.0 |

Example 26

A formulation in the form of a wettable powder is prepared by the admixture of the following components. The Hyflo-Supercel is ground with the organo-phosphorous compound and mixed with the other components.

|  | Percent |
|---|---|
| Phenothiazine (technical) | 88.0 |
| O,O-bis-(2-chloroethyl)-O-7-(3-chloro - 4 - methyl-coumarinyl)phosphate | 4.4 |
| Hyflo-Super-Cel | 4.4 |
| Perminal BX | 2.0 |
| Magnesium sulphate, 1.5 H₂O | 1.2 |

Example 27

A formulation comprising a dispersible powder.

|  | G. |
|---|---|
| Bephenium hydroxynaphthoate (fine powder) | 4.5 |
| O,O-bis-(2-chloroethyl)-O-7-(3-chloro - 4 - methyl-coumarinyl)phosphate | 0.75 |
| Starch | 0.44 |
| Cetrimide | 0.01 |
| Calcium silicate | 0.05 |

The starch and half the calcium silicate were mixed and added to the bephenium hydroxynaphthoate and the organo-phosphorus compound in a suitable mechanical mixer. The cetrimide dissolved in a sufficient quantity of industrial alcohol was mixed lightly into the powders. The moist mass was sifted and dried at a temperature of about 50° to give granules. The remainder of the calcium silicate was then mixed with granules.

Example 28

A formulation in the form of a solution was prepared from the following:

|  | Percent |
|---|---|
| O,O-bis-(2-chloroethyl)-O-7-(3 - chloro - 4 - methyl-coumarinyl)phosphate | 30 |
| Glyceryl monostearate | 2 |
| Glyceryl formal | 68 |

Example 29

O,O-bis-(2 - chloroethyl)-O-7(4-[p - nitrophenyl]coumarinyl)phosphate was made in a manner similiar to Exple 4 and had a M.P. of 90–92°. On analysis it was found to contain chlorine 14.2%, phosphorus 6.35% (theoretical amounts are chlorine 14.5%, phosphorus 6.35%).

We claim:

1. A compound of the formula

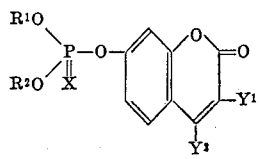

wherein $R^1$ and $R^2$ are each alkyl of from one to six carbon atoms and at least one of the said $R^1$ and $R^2$ is substituted with one halogen atom selected from the class consisting of chlorine and bromine; X is selected from the class consisting of oxygen and sulphur atoms; and $Y^1$ and $Y^2$ are each selected from the class consisting of hydrogen and a halogen atom selected from the class consisting of chlorine and bromine, alkyl of from one to four carbon atoms, benzyl and phenyl carrying in each position of the ring a member selected from the class consisting of nitro, a hydrogen atom and a halogen atom selected from the class consisting of chlorine and bromine and alkyl containing from one to four carbon atoms, and alkylene which with other member of the $Y^1$ and $Y^2$ forms $Y^1$—$Y^2$ which is an alkylene chain containing from three to six carbon atoms.

2. A compound as claimed in claim 1, wherein $R^1$ and $R^2$ are each alkyl containing from two to four carbon atoms and the said $R^1$ and $R^2$ are each substituted with a member selected from the class consisting of chlorine and bromine atoms, X is an oxygen atom, $Y^1$ is selected from the class consisting of hydrogen, chlorine and bromine atoms and methyl, ethyl and benzyl, and $Y^2$ is selected from the class consisting of methyl and ethyl and phenyl substituted in each position of the ring with a member selected from the class consisting of hydrogen and chlorine atoms.

3. O,O - bis - (2 - chloroethyl) - O - 7 - (4 - methyl-coumarinyl)phosphate.

4. O,O - bis - (2 - chloroethyl) - O - 7 - (3 - chloro-4-methylcoumarinyl)phosphate.

5. O,O - bis - (3 - chloropropyl) - O - 7 - (4 - methyl-coumarinyl)phosphate.

6. O,O - bis - (2 - chloropropyl) - O - 7 - (4 - methyl-coumarinyl)phosphate.

7. O,O - bis - (2 - chloroethyl) - O - 7 -(3 - ethyl - 4-methylcoumarinyl)phosphate.

8. O,O - bis - (2 - chloroethyl) - O - 7 - (4 - phenyl-coumarinyl)phosphate.

9. O,O - bis - (3 - chloropropyl) - O - 7 - (3 - chloro-4-methylcoumarinyl)phosphate.

10. O,O - bis - (2 - chloroethyl) - O - 7 - (3 - methyl-4-ethylcoumarinyl)phosphate.

11. O,O - bis - (2 - chloroethyl) - O - 7 - (4 - [2,4-dichlorophenyl]coumarinyl)phosphate.

12. O,O - bis - (2 - chloroethyl) - O - 7 - (3 - bromo-4-methylcoumarinyl)phosphate.

13. A method for the treatment of an infection of nematodes of the gastro-intestinal tract comprising the oral administration of an effective amount of organo-phosphorus compound as defined in claim 1 to the host of the nematode infection.

(References on following page)

References Cited by the Examiner

FOREIGN PATENTS 510,817  5/1952  Belgium.
523,206  3/1956  Canada.
534,584  4/1949  Canada.

OTHER REFERENCES

Losco et al., Gazz. Chim. Ital., volume 89 (1959), pages 1298–1314.

WALTER A. MODANCE, *Primary Examiner.*
J. A. PATTEN, *Assistant Examiner.*